United States Patent
Flegal

(10) Patent No.: US 6,377,600 B1
(45) Date of Patent: Apr. 23, 2002

(54) IODINE MONOCHLORIDE/MOLECULAR IODINE AS THE IODINE SOURCE FOR COIL SYSTEMS

(75) Inventor: Carl A. Flegal, Los Angeles, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/325,112

(22) Filed: Jun. 3, 1999

(51) Int. Cl.⁷ .............................. H01S 3/095
(52) U.S. Cl. ........................................... 372/89
(58) Field of Search ....................... 372/89, 90

(56) References Cited

U.S. PATENT DOCUMENTS

| | | | |
|---|---|---|---|
| 3,980,509 A | 9/1976 | Lubowitz et al. | 149/19.3 |
| 3,991,384 A | 11/1976 | Betts | 372/89 |
| 3,992,685 A | 11/1976 | Ogren et al. | 372/89 |
| 4,048,586 A | 9/1977 | Witte et al. | 372/89 |
| 4,099,140 A | 7/1978 | Snelling et al. | 372/89 |
| 4,217,558 A | 8/1980 | Aprahamian et al. | 372/89 |
| 4,237,429 A | 12/1980 | Hook et al. | 372/89 |
| 4,267,526 A | 5/1981 | McDermott et al. | 372/89 |
| 4,434,492 A | 2/1984 | Benard et al. | 372/59 |
| 4,514,698 A | 4/1985 | Blumenthal et al. | 372/33 |
| 4,558,451 A | 12/1985 | McDermott et al. | 372/89 |
| 4,653,062 A | 3/1987 | Davis et al. | 372/89 |
| 4,787,091 A | 11/1988 | Wagner | 372/89 |
| 5,624,654 A | 4/1997 | Clendening, Jr. et al. | 423/579 |
| 5,682,400 A | 10/1997 | Krasnov | 372/82 |

*Primary Examiner*—Leon Scott, Jr.
*Assistant Examiner*—Jeffrey Zahn
(74) *Attorney, Agent, or Firm*—Harness, Dickey & Pierce, P.L.C.

(57) ABSTRACT

An iodine source for a chemical oxygen iodine laser (COIL) system (40, 50) is described. The iodine source is a combination of iodine monochloride and molecular iodine. The iodine monochloride and molecular iodine may be injected either simultaneously or sequentially through separate manifold/conduit assemblies (30, 102) into the mixing nozzle (22), or they may be combined together into a single gaseous feed stream. The iodine monochloride may be dissociated prior to being injected into the mixing nozzle (22) or, alternatively, the dissociated iodine monochloride may be combined with the molecular iodine feed stream in order to initiate the atomic iodine/molecular iodine chain reaction prior to injection into the mixing nozzle (22).

26 Claims, 2 Drawing Sheets

IODINE MONOCHLORIDE/MOLECULAR IODINE AS THE IODINE SOURCE FOR COIL SYSTEMS

BACKGROUND OF THE INVENTION

1. Field of the Invention

The present invention relates generally to chemical laser systems, and more particularly to the use of iodine monochloride and molecular iodine as the iodine source for chemical oxygen iodine laser (COIL) systems.

2. Discussion of the Related Art

The fact that an atom will emit a photon of radiation when one of its electrons drops to a lower energy state has enabled the laser to be employed in a number of military, industrial, and medical applications. The term "laser" is an acronym for light amplification by stimulated emission of radiation. In its simplest form, a laser consists of a rod of transparent crystal or a tube filled with gas or liquid. A mirror is placed at one end and a half-silvered mirror at the other end. The laser is then "pumped" by adding energy, e.g., by shining another light source into it, by adding electrical energy, or by stimulating a chemical reaction. This process raises electrons in the laser to higher energy states.

During the pumping process, some of the electrons will spontaneously fall back to a lower energy state, emitting photons. The photons that travel toward the sides of the laser are quickly lost, but those traveling along the length of the rod or tube are reflected back by the mirrors. This activity generally occurs in the area commonly referred to as the laser gain region. When these photons strike other excited atoms, they stimulate those atoms to release photons of the exact same energy level (or wavelength), which travel in the same direction as the stimulating photons. The result is an intense, highly focused beam of light escaping through the half-silvered end of the laser. This light beam is generally referred to as a beam of high energy coherent radiation, or more commonly, a laser beam.

Because the photon wavelength is determined by the characteristics of the atoms in the lasing material, laser light is of a single wavelength. Because laser light travels in a tight beam, it can carry a great deal of energy over a great distance without significant loss. With respect to recent developments in laser technology, there has been increased interest in chemical laser systems, especially COIL systems.

The COIL system was initially developed for military applications; however, recent attention has turned to potential industrial uses of COIL systems, such as metal cutting applications.

In a COIL system, chlorine gas reacts with a solution of basic hydrogen peroxide (i.e., $H_2O_2$) (usually KOH or NaOH mixed with hydrogen peroxide) to produce a gaseous flow of excited oxygen, also referred to as singlet delta oxygen or singlet molecular oxygen (designated as $O_2^*$, $O_2(^1\Delta)$, as well as by other symbols). This gaseous flow of singlet delta oxygen collides (typically at speeds approaching or even exceeding the speed of sound) with iodine gas molecules (i.e., $I_2$), dissociating them and subsequently exciting the resulting iodine atoms (i.e., I), which lase at 1.315 $\mu$m. The major laser byproducts are various salts (e.g., NaCl or KCl) and heat. The small amounts of iodine can be scrubbed from the output.

FIG. 1 illustrates a highly simplified schematic of the intended operation of a conventional COIL system 10. The initial step is to generate the singlet delta oxygen. This is accomplished by providing a source 12 of basic hydrogen peroxide, typically in liquid form, and a source 14 of molecular chlorine, typically in gaseous form. These two materials are then charged or injected into a singlet delta oxygen generator 16 through appropriate manifold/conduit assemblies 18, 20, respectively. The resulting exothermic reaction between the basic hydrogen peroxide liquid and the molecular chlorine gas produces the gaseous singlet delta oxygen, as well as several by-products, such as salt and heat. The heat can be removed by appropriate devices such as a heat exchanger (not shown), and the salt can be removed by appropriate devices such as a scrubber (not shown). The skilled artisan will appreciate that various well-known auxiliary components of the conventional COIL system 10 have been omitted for ease of illustration.

Once the gaseous singlet delta oxygen is generated, it is then charged or injected in flow form into a mixing nozzle 22 at the appropriate time. The mixing nozzle 22 has a throat portion 23 which generally divides the mixing nozzle 22 into a subsonic zone 24 and a supersonic zone 26; that is, the flow of gaseous singlet delta oxygen is subsonic in one portion of the mixing nozzle 22 and supersonic at the other portion of the mixing nozzle 22. The mixing of reactants is typically done in the subsonic zone 24.

A molecular iodine generator 28 is in communication with the mixing nozzle 22 by an appropriate manifold/conduit assembly 30. At the appropriate time, gaseous molecular iodine is then charged or injected into the mixing nozzle 22 in such a manner so as to let it "pool" before completely mixing with the singlet delta oxygen gas flowing from the singlet delta oxygen generator 16. The slight delay in mixing due to this "pooling" permits the singlet delta oxygen to dissociate only some of the molecular iodine on the edge of the "pool" and thus initiate the chain reaction dissociation of molecular iodine by the product atomic iodine. However, in this "pooling" process, significant singlet delta oxygen is nonetheless lost due to excess reaction with molecular oxygen or deactivation with water, iodine, liquid or solid surfaces, or other loss mechanisms.

The primary reactions taking place in connection with the conventional COIL system 10 are as follows:

(1) $I_2 + O_2^* \rightarrow I_2^* + O_2$. That is, a mole of molecular iodine reacts with a mole of singlet delta oxygen to produce a mole of excited molecular iodine and a mole of molecular oxygen.

(2) $I_2^* + O_2^* \rightarrow 2I + O_2$. That is, a mole of excited molecular iodine reacts with a mole of singlet delta oxygen to produce a two moles of atomic iodine and a mole of molecular oxygen.

(3) $I + O_2^* \rightarrow I^* + O_2$. That is, a mole of atomic iodine reacts with a mole of singlet delta oxygen to produce a mole of excited atomic iodine and a mole of molecular oxygen.

(4) $I^* \rightarrow I + h\nu$. That is, a mole of excited atomic iodine releases a mole equivalent of photons (h$\nu$), thus producing a mole of atomic iodine.

The singlet delta oxygen gas flow initially contacts the gaseous molecular iodine "pool" at subsonic speed; however, the singlet delta oxygen gas flow is quickly brought up to near supersonic or even supersonic speed (via appropriate devices such as a venturi) and is expelled out through the mixing nozzle 22 into the area known as the laser gain region 32 of the laser cavity 33. It is in this area where the excited atomic iodine releases its photon. The released photon is then reflected many times between a set of mirrors 34, the first mirror 36 being fully reflective, the second mirror 38 being partially reflective. The reflected photons eventually form a laser beam 40, which is transmitted through the partially reflective mirror 38 at a wavelength of 1.315 μm. Any remaining chemical species are removed from the laser gain region 32 by a combination of exhaust assemblies (not shown) and scrubber assemblies (not shown) in order to avoid contamination of the laser's mirrors 34.

COIL systems have long been known to output less laser power than is theoretically available from the singlet delta oxygen leaving the generator. There are a number of proposed kinetic explanations for this, as well as several proposed or alternative approaches to increasing the output laser power. The advantages of enhanced power extraction from a given generator are substantial in the weight, volume and complexity of nearly all proposed applications of COIL systems.

Iodine monochloride has been suggested as a replacement for molecular iodine for COIL systems. It was found that under certain circumstances, conventional COIL systems were suffering from condensation of molecular iodine particles that would seriously degrade the laser's operation. This problem was due to the relatively low vapor pressure of molecular iodine. Therefore, it was suggested to employ iodine monochloride which has a vapor pressure of 5300 pascals (Pa) at 300° K, as opposed to molecular iodine which has a vapor pressure of 63 Pa at 300° K. A complete description of this technology can be found in U.S. Pat. No. 4,653,062 to Davis et al. issued Mar. 24, 1987, the entire specification being expressly incorporated herein by reference. Despite the potentially attractive features of rapid iodine monochloride dissociation kinetics, it was found that far greater quantities of singlet delta oxygen were lost than in systems simply employing molecular iodine alone. These losses were so great that further work with iodine monochloride was essentially abandoned.

Therefore, there is a need to develop an iodine source for a COIL system that will possess the required dissociation kinetics in order to efficiently utilize all or most of the available singlet delta oxygen to maximize production of excited atomic iodine and subsequent photon release.

SUMMARY OF THE INVENTION

The present invention provides an iodine source for a COIL system, wherein the iodine source comprises both molecular iodine and iodine monochloride. The molecular iodine and the iodine monochloride are combined together, either prior to or after being charged into the mixing nozzle, in order to initiate a chain reaction between the two that will rapidly make available a large amount of atomic iodine to react with the singlet delta oxygen.

In accordance with the general teachings of the present invention, a chemical oxygen iodine laser system for producing a beam of high energy coherent radiation comprises a singlet delta oxygen generator for producing a gaseous flow of singlet delta oxygen; a molecular iodine generator for producing a gaseous flow of molecular iodine; an iodine monochloride generator for producing a gaseous flow of iodine monochloride; and a mixing nozzle for receiving gaseous reactants and discharging these reactants in a mixing flow.

In accordance with the general teachings of the present invention, a method for producing a beam of high energy coherent radiation comprises the steps of: providing a mixing nozzle for receiving gaseous reactants and discharging these reactants in a mixing flow; providing a gaseous flow of singlet molecular oxygen into the mixing nozzle; providing a gaseous flow of iodine monochloride into the mixing nozzle, the iodine monochloride reacting with the singlet molecular oxygen and thereby dissociating into atomic iodine and atomic chlorine; and providing a gaseous flow of molecular iodine into the mixing nozzle, the molecular iodine reacting with the atomic iodine to produce additional atomic iodine.

In accordance with the general teachings of the present invention, an alternative method for producing a beam of high energy coherent radiation comprises the steps of: providing a mixing nozzle for receiving gaseous reactants and discharging these reactants in a mixing flow; providing a gaseous flow of singlet molecular oxygen into the mixing nozzle; providing an iodine monochloride dissociation assembly; providing a gaseous flow of iodine monochloride into the mixing nozzle, wherein the iodine monochloride is dissociated into atomic iodine and atomic chlorine by the iodine monochloride dissociation assembly prior to entering into the mixing nozzle; and providing a gaseous flow of molecular iodine into the mixing nozzle, the molecular iodine reacting with the atomic iodine to produce additional atomic iodine.

In accordance with the general teachings of the present invention, a second alternative method for producing a beam of high energy coherent radiation comprises the steps of: providing a mixing nozzle for receiving gaseous reactants and discharging these reactants in a mixing flow; providing a gaseous flow of singlet molecular oxygen into the mixing nozzle; providing a gaseous flow of molecular iodine into the mixing nozzle; providing an iodine monochloride dissociation assembly; and providing a gaseous flow of iodine monochloride into the gaseous flow of molecular iodine, wherein the iodine monochloride is dissociated into atomic iodine and atomic chlorine by the iodine monochloride dissociation assembly prior to entering into the gaseous flow of molecular iodine molecular, the atomic iodine reacting with the molecular iodine to produce additional atomic iodine.

Additional objects, advantages, and features of the present invention will become apparent from the following description and appended claims, taken in conjunction with the accompanying drawings.

BRIEF DESCRIPTION OF THE DRAWINGS

The same reference numerals refer to the same parts throughout the various Figures

DETAILED DESCRIPTION OF THE PREFERRED EMBODIMENTS

Figure 1:
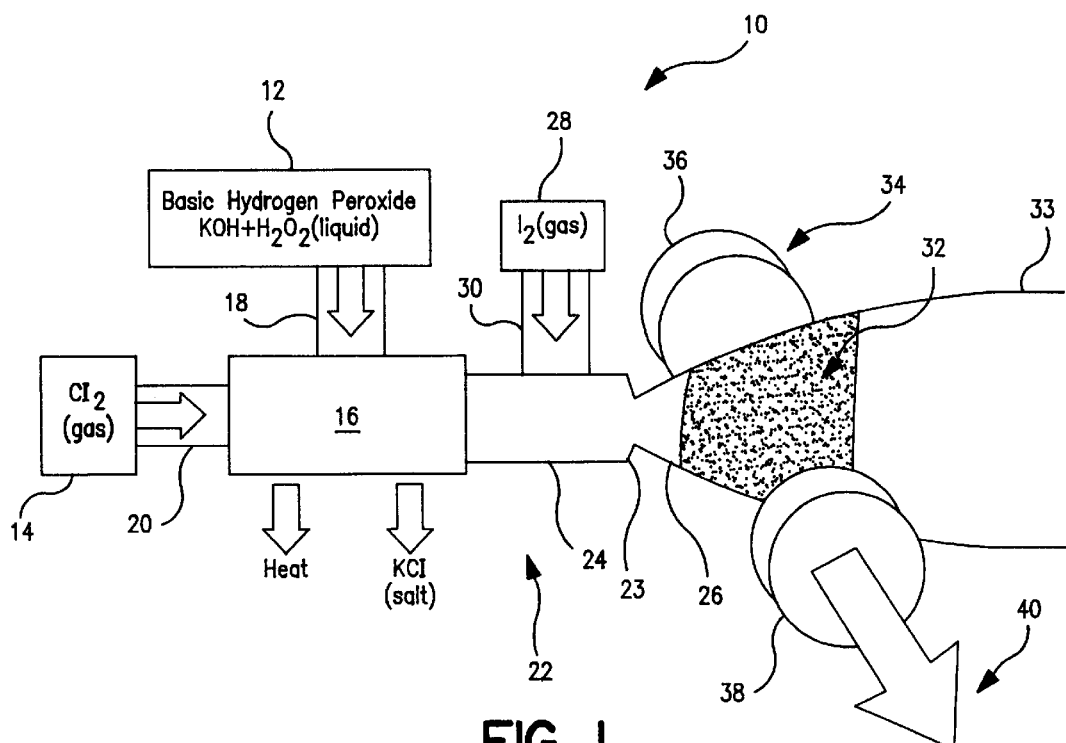
FIG. 1 is a schematic view of a conventional COIL system.

The following discussion of the preferred embodiments directed to an iodine source for a COIL system, wherein the iodine source comprises iodine monochloride and molecular iodine are merely exemplary in nature, and are in no way intended to limit the invention or its applications or uses.

The present invention provides a method and apparatus for catalyzing the dissociation of molecular iodine in COIL systems through the addition of iodine monochloride before or just after injection of the molecular iodine gas stream into the mixing nozzle. Iodine monochloride is known to be substantially easier to dissociate than molecular iodine. As previously mentioned, the first kinetic step in currently available COIL systems requires the dissociation of molecular iodine into atomic iodine by singlet delta oxygen. This kinetic process is considerably slower than the subsequent chain reaction of the resulting atomic iodine with molecular iodine. It is largely for this reason that molecular iodine injection is generally done on the subsonic portion of the mixing nozzle. The addition of iodine monochloride to the iodine feedstream in slight amounts, generally in the range of about 0.01 to about 10 molar percent, provides rapid access of the molecular iodine gas stream with atomic iodine from the iodine monochloride dissociation with which to initiate the molecular iodine dissociation chain reaction without requiring singlet delta oxygen.

One of the unique features of the present invention is that molecular iodine is preserved as the primary source of atomic iodine for COIL systems. Iodine monochloride is added only in catalytic amounts to seed the atomic iodine/molecular iodine dissociation chain reaction. Thus, only relatively small amounts of iodine monochloride are required (e.g., generally in the range of 0.01–10% (molar) of the molecular iodine feed). Substantial advantages in COIL systems result from the present invention. The dissociation properties and characteristics of the molecular iodine/iodine monochloride gas stream feeds may be tailored for each COIL system so that there is no need for conventional iodine "pooling" after injection. Therefore, the location of the iodine gas stream feed can be either before or after the nozzle throat to permit tailoring of the laser mode. In accordance with a preferred embodiment of the present invention, injection of the iodine gas feed stream is on the supersonic portion of the mixing nozzle. In this case, the very rapid initial lazing of the classical COIL systems can be eliminated or tailored depending upon the application and resonator design or other system level requirements. However, it should be noted that the injection of the iodine gas feed stream may also be done on the subsonic portion of the mixing nozzle, as in conventional COIL systems.

Altering the injection point of the iodine feed stream permits very close coupling of the singlet delta oxygen generator and the nozzle throat, significantly diminishing loss of the singlet delta oxygen available for the key kinetic step for lazing. In most applications, it will be preferable to add the iodine monochloride to the molecular iodine feed stream just prior to injection into the mixing nozzle in order to initiate the dissociation chain reaction just prior to injection.

Iodine monochloride may be dissociated by heat (i.e., thermal dissociation) or light (i.e., photodissociation). By way of a non-limiting example, thermal dissociation may be accomplished by heating either the injection holes in the mixing nozzle or the feed line to the injection holes. Alternatively, heat generating devices such as those generating radio frequency (RF) energy or microwave energy may also be employed. Photodissociation may be accomplished by shining light produced by a light generating source onto the iodine monochloride in order to initiate the dissociation of iodine monochloride within the molecular iodine feed stream.

The molecular iodine feed stream is generally picked up from the iodine source in a stream of heated helium. The iodine monochloride may be added stoichiometrically anywhere in the subsequent handling of the mixed iodine/helium stream. The preferred approach to adding iodine monochloride is to use the lazing intensity or other lazing parameters to drive the metering system to maintain precise lazing parameters throughout the entire period of lazing.

Figure 2:
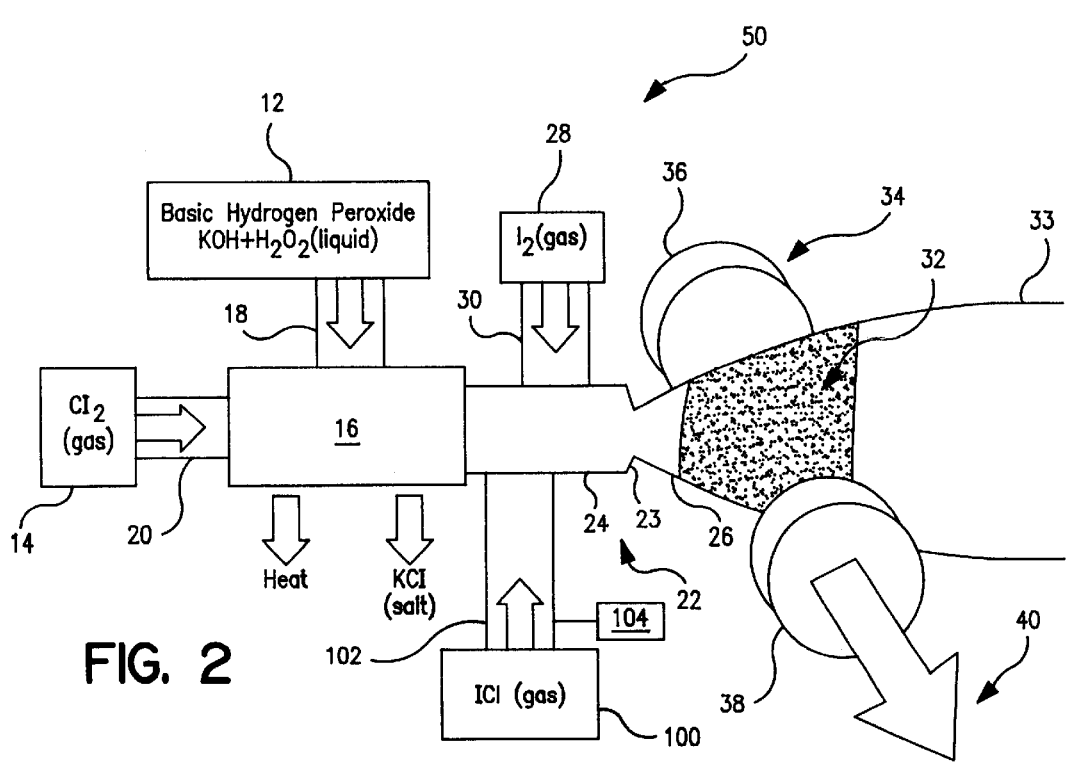
FIG. 2 is a schematic view of a COIL system, in accordance with one embodiment of the present invention.

To illustrate one embodiment of the present invention, reference is made to FIG. 2. As can be seen, the basic features of this COIL system 50 are similar to those depicted in FIG. 1. However, the notable difference can be found in the addition of an iodine monochloride generator 100 that is in communication with the mixing nozzle 22, through a manifold/conduit assembly 102. Although the manifold/conduit assembly 102 is shown as terminating on the subsonic portion 24 of the mixing nozzle 22, it is envisioned that the manifold/conduit assembly 102 may also be configured to terminate on the supersonic portion 26 of the mixing nozzle 22, if so desired. Additionally, although the manifold/conduit assembly 30 is shown as terminating on the subsonic portion 24 of the mixing nozzle 22, it is envisioned that the manifold/conduit assembly 30 may also be configured to terminate on the supersonic portion 26 of the mixing nozzle 22, if so desired.

The intended purpose of the iodine monochloride generator 100 is to provide a gaseous flow of the iodine monochloride into the mixing nozzle 22 at the appropriate time. When the gaseous flow of the iodine monochloride enters the mixing nozzle 22, it will react with the gaseous flow of singlet delta oxygen and dissociate into an iodine atom and a chlorine atom. The iodine atom will then react with the incoming gaseous flow of molecular iodine to produce three atoms of iodine. The atomic iodine will then react with additional singlet delta oxygen to produce excited atomic iodine. The excited atomic iodine will release a photon, thus enabling the formation of the laser beam.

Because iodine monochloride can dissociate by other methods besides reacting with singlet delta oxygen, an optional iodine monochloride dissociation assembly 104 may be employed to dissociate the iodine monochloride before it is injected into the mixing nozzle 22. The iodine monochloride dissociation assembly 104 may be comprised of any type of heat, light, radio frequency, or microwave energy generating devices. Although the iodine monochloride dissociation assembly 104 is depicted as being located on the manifold/conduit assembly 102, it may be positioned anywhere between the mixing nozzle 22 and the iodine monochloride generator 100.

Figure 3:
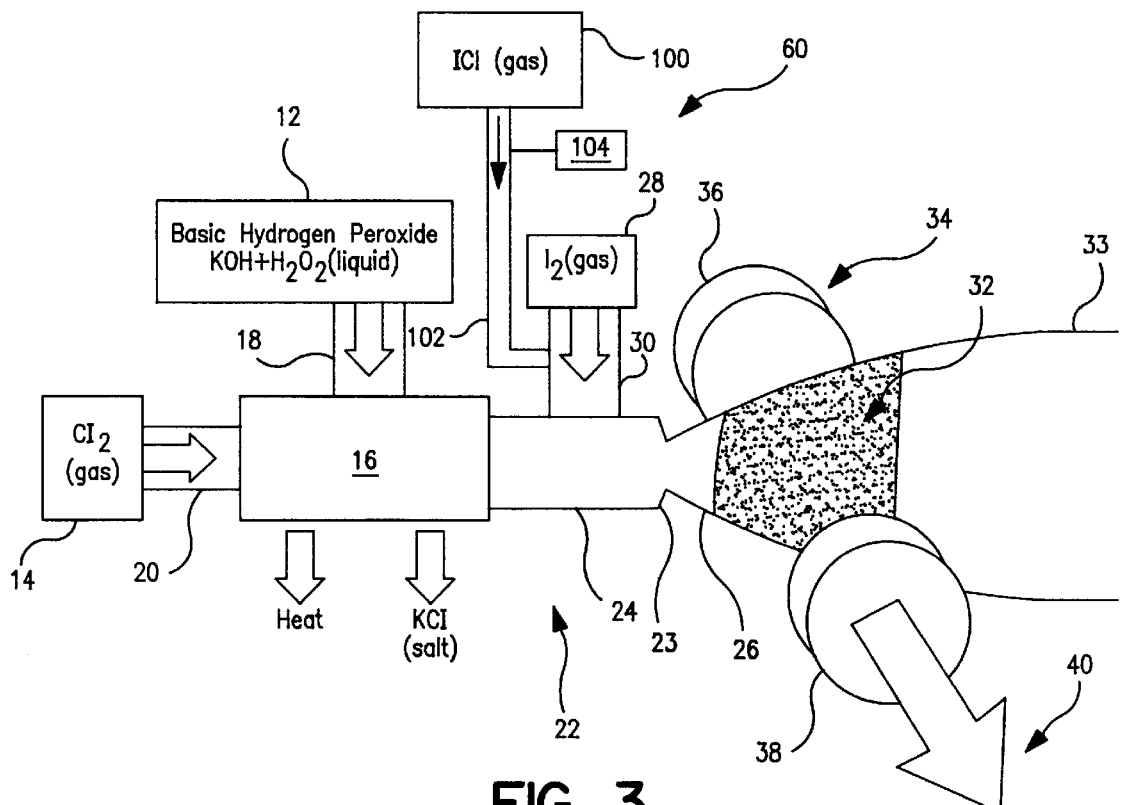
FIG. 3 is a schematic view of a COIL system, in accordance with an alternative embodiment of the present invention.

To illustrate an alternative embodiment of the present invention, reference is made to FIG. 3. As can be seen, the basic features of this COIL system 60 are similar to those depicted in FIG. 2. However, the notable difference can be found in that the iodine monochloride generator 100 is in communication with the molecular iodine generator 28 (through a manifold/conduit assembly 102), as opposed to the mixing nozzle 22. Again, an optional iodine monochloride dissociation assembly 104 may be employed to dissociate the iodine monochloride before it is injected into the molecular iodine gas feed stream's manifold/conduit assembly 30. Additionally, although the manifold/conduit assembly 30 is shown as terminating on the subsonic portion 24 of the mixing nozzle 22, it is envisioned that the manifold/conduit assembly 30 may also be configured to terminate on the supersonic portion 26 of the mixing nozzle 22, if so desired.

By configuring the COIL system 60 in this manner, the chain reaction between the atomic iodine (from the iodine monochloride dissociation) and the molecular iodine may occur before the iodine gas feed stream enters the mixing nozzle 22, provided that the iodine monochloride dissociation assembly 104 is actuated. Accordingly, when the iodine gas feed stream does enter the mixing nozzle 22, a significant amount of atomic iodine will be immediately available to react with any available singlet delta oxygen, thus avoiding any significant loss or waste of singlet delta oxygen.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A chemical oxygen iodine laser system for producing a beam of high energy coherent radiation, comprising:
   a singlet delta oxygen generator for producing a gaseous flow of singlet delta oxygen;
   a molecular iodine generator for producing a gaseous flow of molecular iodine;
   an iodine monochloride generator for producing a gaseous flow of iodine monochloride; and
   a mixing nozzle for receiving said gaseous flows and discharging said gaseous flows in a mixing flow.

2. The chemical oxygen iodine laser system according to claim 1, further comprising;
   a singlet delta oxygen manifold connected by a conduit to the singlet delta oxygen generator and to the mixing nozzle for providing a flow of gaseous singlet delta oxygen to the mixing nozzle;
   a molecular iodine manifold connected by a conduit to the molecular iodine generator and to the mixing nozzle for providing a flow of gaseous molecular iodine to the mixing nozzle; and
   an iodine monochloride manifold connected by a conduit to the iodine monochloride generator and to the mixing nozzle for providing a flow of gaseous iodine monochloride to the mixing nozzle.

3. The chemical oxygen iodine laser system according to claim 1 wherein the mixing nozzle further comprises:
   a first portion characterized in that the gaseous flow of singlet delta oxygen is at a subsonic speed; and
   a second portion characterized in that the gaseous flow of singlet delta oxygen is at a supersonic speed.

4. The chemical oxygen iodine laser system according to claim 1 wherein the conduit of the molecular iodine manifold is connected to the first portion of the mixing nozzle.

5. The chemical oxygen iodine laser system according to claim 1 wherein the conduit of the molecular iodine manifold is connected to the second portion of the mixing nozzle.

6. The chemical oxygen iodine laser system according to claim 1 wherein the conduit of the iodine monochloride manifold is connected to the first portion of the mixing nozzle.

7. The chemical oxygen iodine laser system according to claim 1 wherein the conduit of the iodine monochloride manifold is connected to the second portion of the mixing nozzle.

8. The chemical oxygen iodine laser system according to claim 1, further comprising:
   a laser cavity formed by a sealed enclosure connected to the mixing nozzle for receiving the flow of gaseous singlet delta oxygen, molecular iodine, and iodine monochloride from the mixing nozzle;
   whereby the iodine monochloride reacts with the singlet delta oxygen and disassociates into atomic iodine and atomic chlorine, the atomic iodine reacts with the molecular iodine to form atomic iodine, the atomic iodine reacts with the singlet delta oxygen to raise the atomic iodine to a lasing state and permits the extraction of a laser beam from the laser cavity.

9. The chemical oxygen iodine laser system according to claim 1, further comprising:
   a laser cavity formed by a sealed enclosure connected to the mixing nozzle for receiving the flow of gaseous singlet delta oxygen, molecular iodine, and iodine monochloride from the mixing nozzle; and
   an iodine monochloride dissociation assembly being in communication with the iodine monochloride generator and the iodine monochloride manifold;
   whereby the iodine monochloride dissociation assembly causes the iodine monochloride to disassociate into atomic iodine and atomic chlorine, the atomic iodine reacts with the molecular iodine to form atomic iodine, the atomic iodine reacts with the singlet delta oxygen to raise the atomic iodine to a lasing state and permits the extraction of a laser beam from the laser cavity.

10. The chemical oxygen iodine laser system according to claim 9, wherein the iodine monochloride dissociation assembly is selected from the group consisting of devices capable of producing radio frequency energy, microwave energy, light, heat, and combinations thereof.

11. The chemical oxygen iodine laser system according to claim 1, further comprising:
    an exhaust manifold connected to the laser cavity for extracting the reactants from the laser cavity.

12. The chemical oxygen iodine laser system according to claim 1, wherein the molar ratio of iodine monochloride to molecular iodine is in the range of about 0.01:99.99 to about 10:90.

13. A method for producing a beam of high energy coherent radiation, comprising the steps of:
    providing a mixing nozzle for receiving gaseous reactants and discharging these reactants in a mixing flow;
    providing a gaseous flow of singlet molecular oxygen into the mixing nozzle;
    providing a gaseous flow of iodine monochloride into the mixing nozzle, the iodine monochloride reacting with the singlet molecular oxygen and thereby dissociating into atomic iodine and atomic chlorine; and
    providing a gaseous flow of molecular iodine into the mixing nozzle, the molecular iodine reacting with the atomic iodine to produce additional atomic iodine.

14. The method for producing a beam of high energy coherent radiation according to claim 13, further comprising the step of:
    providing a laser cavity formed by a sealed enclosure connected to the mixing nozzle for receiving the flow of gaseous reactants from the mixing nozzle;
    whereby the atomic iodine reacts with the singlet oxygen to raise the atomic iodine to a lasing state and permits the extraction of a laser beam from the laser cavity.

15. A method for producing a beam of high energy coherent radiation, comprising the steps of:
    providing a mixing nozzle for receiving gaseous reactants and discharging these reactants in a mixing flow;
    providing a gaseous flow of singlet molecular oxygen into the mixing nozzle;
    providing an iodine monochloride dissociation assembly;
    providing a gaseous flow of iodine monochloride into the mixing nozzle, wherein the iodine monochloride is dissociated into atomic iodine and atomic chlorine by the iodine monochloride dissociation assembly prior to entering into the mixing nozzle; and
    providing a gaseous flow of molecular iodine into the mixing nozzle, the molecular iodine reacting with the atomic iodine to produce additional atomic iodine.

16. The method for producing a beam of high energy coherent radiation according to claim 15, further comprising the step of:

providing a laser cavity formed by a sealed enclosure connected to the mixing nozzle for receiving the flow of gaseous reactants from the mixing nozzle;

whereby the atomic iodine reacts with the singlet oxygen to raise the atomic iodine to a lasing state and permits the extraction of a laser beam from the laser cavity.

17. The method for producing a beam of high energy coherent radiation according to claim 15, wherein the iodine monochloride dissociation assembly is selected from the group consisting of devices capable of producing radio frequency energy, microwave energy, light, heat, and combinations thereof.

18. A method for producing a beam of high energy coherent radiation, comprising the steps of:

providing a mixing nozzle for receiving gaseous reactants and discharging these reactants in a mixing flow;

providing a gaseous flow of singlet molecular oxygen into the mixing nozzle;

providing a gaseous flow of molecular iodine into the mixing nozzle;

providing an iodine monochloride dissociation assembly; and providing a gaseous flow of iodine monochloride into the gaseous flow of molecular iodine, wherein the iodine monochloride is dissociated into atomic iodine and atomic chlorine by the iodine monochloride dissociation assembly prior to entering into the gaseous flow of molecular iodine molecular, the atomic iodine reacting with the molecular iodine to produce additional atomic iodine.

19. The method for producing a beam of high energy coherent radiation according to claim 18, further comprising the step of:

providing a laser cavity formed by a sealed enclosure connected to the mixing nozzle for receiving the flow of gaseous reactants from the mixing nozzle;

whereby the atomic iodine reacts with the singlet oxygen to raise the atomic iodine to a lasing state and permits the extraction of a laser beam from the laser cavity.

20. The method for producing a beam of high energy coherent radiation according to claim 18, wherein the iodine monochloride dissociation assembly is selected from the group consisting of devices capable of producing radio frequency energy, microwave energy, light, heat, and combinations thereof.

21. A chemical oxygen iodine laser system for producing a beam of high energy coherent radiation, comprising:

a singlet delta oxygen generator for producing a gaseous flow of singlet delta oxygen;

a molecular iodine generator;

an iodine monochloride generator for producing a gaseous flow of iodine monochloride in fluid communication with said molecular iodine generator; said molecular iodine generator producing a gaseous flow comprising a mixture of molecular iodine and iodine monochloride; and a mixing nozzle in fluid communication with said singlet delta oxygen generator and said molecular iodine generator for receiving said gaseous flows and discharging said flows in a mixing flow.

22. The chemical oxygen iodine laser system according to claim 21, further comprising;

a singlet delta oxygen manifold connected by a conduit to the singlet delta oxygen generator and to the mixing nozzle for providing a flow of gaseous singlet delta oxygen to the mixing nozzle;

a molecular iodine manifold connected by a conduit to the molecular iodine generator and to the mixing nozzle for providing a flow of gaseous molecular iodine to the mixing nozzle; and an iodine monochloride manifold connected by a conduit to the iodine monochloride generator and to the molecular iodine generator for providing a flow of gaseous iodine monochloride to the molecular iodine generator.

23. The chemical oxygen iodine laser system according to claim 21 wherein the mixing nozzle further comprises:

a first portion characterized in that the gaseous flow of singlet delta oxygen is at a subsonic speed; and a second portion characterized in that the gaseous flow of singlet delta oxygen is at a supersonic speed.

24. The chemical oxygen iodine laser system according to claim 21 wherein the conduit of the molecular iodine manifold is connected to the first portion of the mixing nozzle.

25. The chemical oxygen iodine laser system according to claim 21 wherein the conduit of the molecular iodine manifold is connected to the second portion of the mixing nozzle.

26. The chemical oxygen iodine laser system according to claim 21, further comprising:

a laser cavity formed by a sealed enclosure connected to the mixing nozzle for receiving the flow of gaseous singlet delta oxygen, molecular iodine, and iodine monochloride from the mixing nozzle;

whereby the iodine monochloride reacts with the singlet delta oxygen and dissociates into atomic iodine and atomic chlorine, the atomic iodine reacts with the molecular iodine to form atomic iodine, the atomic iodine reacts with the singlet delta oxygen to raise the atomic iodine to a lasing state and permits the extraction of a laser beam from the laser cavity.

* * * * *